(12) United States Patent
Richardson et al.

(10) Patent No.: US 11,511,866 B2
(45) Date of Patent: Nov. 29, 2022

(54) INTEGRATED PERSONAL HUMIDIFIER SYSTEM

(71) Applicant: The Boeing Company, Chicago, IL (US)

(72) Inventors: Marcus Karel Richardson, Everett, WA (US); Michael J. Dessero, Mill Creek, WA (US); Sook Kenna Kim, Newport Coast, CA (US)

(73) Assignee: THE BOEING COMPANY, Chicago, IL (US)

( * ) Notice: Subject to any disclaimer, the term of this patent is extended or adjusted under 35 U.S.C. 154(b) by 435 days.

(21) Appl. No.: 16/830,405

(22) Filed: Mar. 26, 2020

(65) Prior Publication Data
US 2021/0300570 A1    Sep. 30, 2021

(51) Int. Cl.
*B64D 13/06* (2006.01)
*C02F 1/32* (2006.01)

(52) U.S. Cl.
CPC ................ *B64D 13/06* (2013.01); *C02F 1/32* (2013.01); *C02F 2303/04* (2013.01)

(58) Field of Classification Search
CPC .. C02F 1/03; C02F 2303/04; C02F 2201/001; C02F 2209/005; C02F 2209/38; C02F 2209/40; B64D 13/06; B64D 2013/065; B64D 2013/0662
See application file for complete search history.

(56) References Cited

U.S. PATENT DOCUMENTS

| 5,944,284 A | * | 8/1999 | Bardel | ................... B64D 13/00 244/1 R |
| 7,758,026 B2 | * | 7/2010 | Kulcke | .................. B64D 13/06 261/78.2 |
| 2015/0165080 A1 | | 6/2015 | Park et al. | |

* cited by examiner

*Primary Examiner* — Lessanework Seifu
(74) *Attorney, Agent, or Firm* — Coats & Bennett, PLLC

(57) ABSTRACT

Methods, systems, and apparatuses for temporarily increasing, on demand, the relative humidity of an area located proximate to a user in environments having lower than ambient relative humidity are provided by integrating a personal humidification circuit into a water delivery circuit to provide a diverted flow of water, and provide a flow of water vapor to a user, and returning the relative humidity-enhanced environment to a predetermined relative humidity by purging the environment.

20 Claims, 7 Drawing Sheets

INTEGRATED PERSONAL HUMIDIFIER SYSTEM

TECHNOLOGICAL FIELD

The present disclosure relates generally to the field of humidification systems. More specifically the present disclosure relates to the field of humidification architecture for the regulated and improved humidification of aircraft during flight.

BACKGROUND

The humidification of air in aircraft cabins has observed the competing interests of passenger comfort and humidification limits in terms of potential damage to aircraft cabin components due to accumulated moisture. As a result, to properly maintain the working condition of aircraft cabin components, cabin air humidity has been significantly less humid than the relative humidity most passengers encounter in their homes. For example, controlled to a level that has not adequately suited the comfort of certain passengers. as the relative humidity of air in an aircraft cabin can range from about 25 to about 30% lower than the average relative humidity in a home environment.

SUMMARY

Presently disclosed aspects are directed to apparatuses, systems, and methods for increasing passenger comfort in aircraft, particularly passenger aircraft, by allowing the selective user control, including the regional increase of aircraft cabin air humidity by incorporating humidification architecture designed to deliver an increase in humidity to a predetermined area proximate to a passenger, on demand, and on a passenger-by-passenger basis.

Further aspects, apparatuses, systems, and methods are disclosed allowing the selective control, including the regional increase of, aircraft cabin relative humidity through the incorporation of humidification architecture designed to deliver an increase in humidity to a passenger on a passenger-by-passenger basis, while compensating for such humidity increases and returning the cabin air to a predetermined relative humidity during aircraft descent.

According to a present aspect, an apparatus is disclosed for increasing relative humidity of an area proximate to a passenger in a predetermined area, with the apparatus including a personal humidification circuit. The personal humidification circuit includes a personal humidification inlet, with the personal humidification circuit inlet in communication with a water supply line, a check valve in communication with the water supply line, a personal humidification circuit water line in communication with the check valve, and a sterilization unit in communication with the personal humidification circuit water line. The apparatus further includes a humidifier in communication with the personal humidification circuit water line, with the humidifier configured to form water vapor and with a water vapor line in communication with the humidifier, and with the water vapor line located downstream from the humidifier. Further, the apparatus includes a personal humidification circuit outlet in communication with the water vapor line, and a controller in communication with the personal humidification circuit, with the controller configured to control a predetermined water vapor flow from the water vapor line to the personal humidification circuit outlet on demand, and with the controller further in communication with an aircraft databus.

In another aspect, the check valve is in communication with the water supply line, and the check valve is configured to divert water flow from the water supply line to the personal humidification circuit line.

In another aspect, the personal humidification circuit is integrated into an existing water delivery circuit.

In a further aspect, the personal humidification circuit outlet is integrated into a structure, wherein said structure comprises at least one of: a cabin wall, a cabin floor, a cabin ceiling, a storage bin, and a passenger seat assembly.

in a further aspect, the sterilization unit comprises a source of ultraviolet radiation.

According to a present aspect, a system for increasing relative humidity of a predetermined area proximate to a user is disclosed, with the system including a water delivery circuit, and with the water delivery circuit including a water supply, a water supply line in communication with the water supply, a water outlet in communication with the water supply line. The system further includes a personal humidification circuit including a personal humidification inlet, with the personal humidification circuit inlet in communication with a water supply line, a check valve in communication with the water supply line, a personal humidification circuit water line in communication with the check valve, and a sterilization unit in communication with the personal humidification circuit water line. The system further includes a humidifier in communication with the personal humidification circuit water line, with the humidifier configured to form water vapor, a water vapor line in communication with the humidifier, with the water vapor line located downstream from the humidifier, and a personal humidification circuit user outlet in communication with the water vapor line. The system further includes a controller in communication with the personal humidification circuit, with the controller configured to control a predetermined water vapor flow from the water vapor line to the personal humidification circuit user outlet, and with the controller further in communication with an aircraft databus, and wherein said personal humidification circuit is configured to release an amount of water vapor to increase the relative humidity of air proximate to a user, with the said user located in a predetermined area.

In another aspect, the personal humidification circuit is configured to release an amount of water vapor from the personal humidification circuit user outlet to increase the relative humidity of air proximate to a user on demand.

In a further aspect, the personal humidification circuit outlet is opened in response to a signal from the controller.

In another aspect, the humidifier is located downstream from the sterilization unit.

In another aspect, the sterilization unit is located downstream from the humidifier.

In a further aspect, the system further includes a purge valve in communication with the personal humidification circuit and said purge valve further in communication with the controller, said purge valve configured to respond to a signal sent from the controller.

In a further aspect, the controller is configured to activate the purge valve in response to a detected pressure differential.

In another aspect, the personal humification circuit is accessed by an individually by a user.

In another aspect, an object includes the aforementioned system, with the object being a vehicle that can be at least one of an aircraft; a spacecraft; a rotorcraft, a satellite; a terrestrial vehicle; a hovercraft; a water borne surface vehicle; a water borne sub-surface vehicle; and combinations thereof.

According to another present aspect, a method for increasing relative humidity of a predetermined area proximate to a user is disclosed, with the method including providing a personal humidification circuit, and with the personal humidification circuit including a personal humidification inlet, with the personal humidification circuit inlet in communication with a water supply line, a check valve in communication with the water supply line, a personal humidification circuit water line in communication with the check valve, a sterilization unit in communication with the personal humidification circuit water line, a humidifier in communication with the personal humidification circuit water line, with the humidifier configured to form water vapor, a water vapor line in communication with the humidifier, said water vapor line located downstream from the humidifier, and a personal humidification circuit user outlet in communication with the water vapor line. The method further includes providing a controller, with the controller in communication with the personal humidification circuit, locating the personal humidification circuit user outlet in an area proximate to a user, and diverting a predetermined amount of a flow of water from a water supply circuit to the personal humidification circuit to form a diverted water flow. The method further includes directing a predetermined amount of the diverted water flow to the sterilization unit, sterilizing a predetermined amount of the diverted water flow to form a sterilized water flow, vaporizing an amount of the sterilized water flow to form an amount of sterilized water vapor, and directing an amount of the sterilized water vapor to the area proximate to a user on demand, and increasing the relative humidity of a predetermined area for a predetermined duration.

In another aspect the method includes integrating the personal humidification circuit into an aircraft cabin structure.

In a further aspect, the method includes integrating the personal humidification circuit into an aircraft water supply circuit.

In a further aspect the controller is in communication with an aircraft databus.

In a further aspect, the method includes purging the personal humidification circuit in response to the controller receiving information from the aircraft databus, and reducing the humidity of the of air present in a cabin environment to a predetermined relative humidity.

The features, functions and advantages that have been discussed can be achieved independently in various aspects or may be combined in yet other aspects, further details of which can be seen with reference to the following description and the drawings.

BRIEF DESCRIPTION OF THE DRAWINGS

Figure 1:
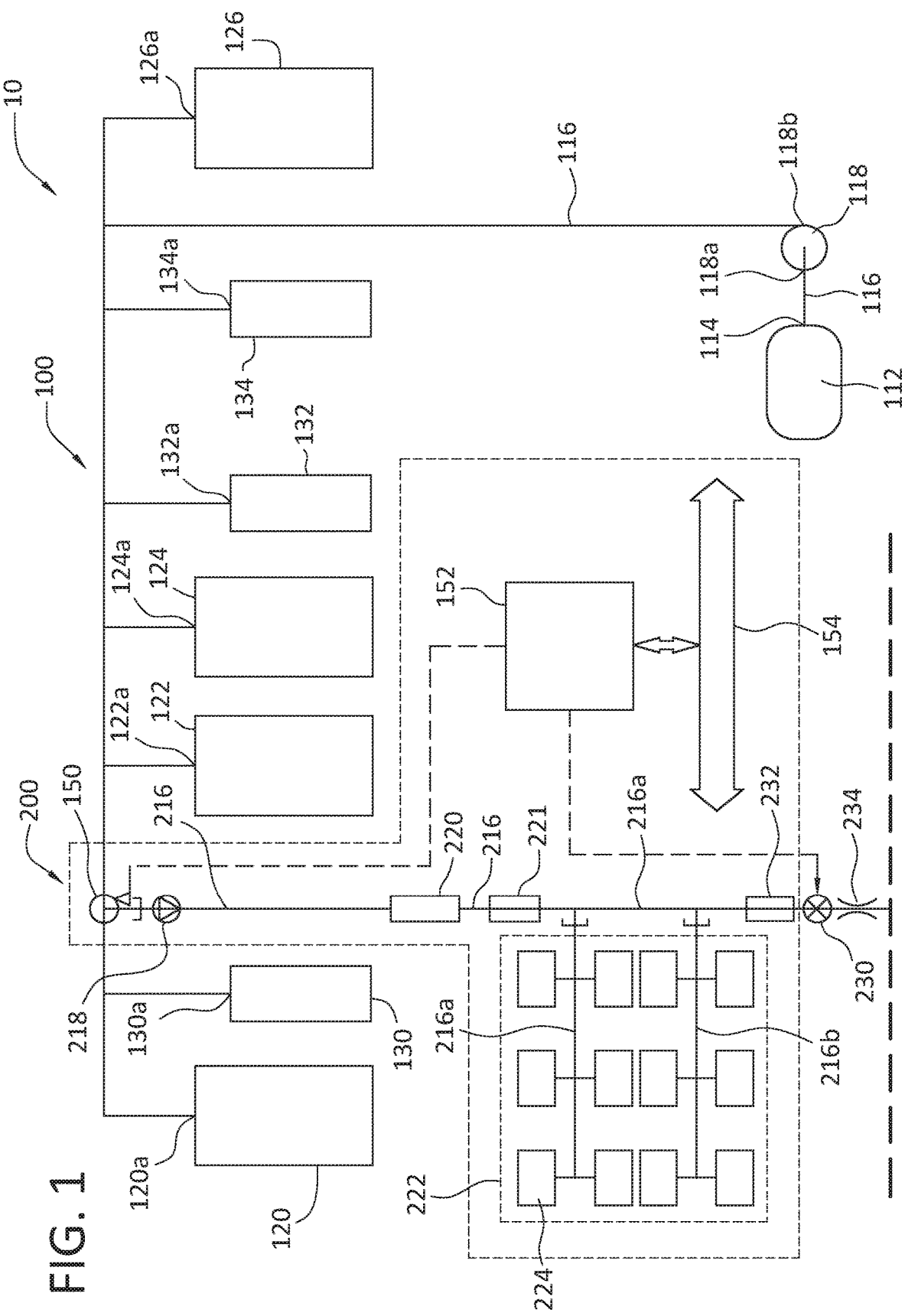
Figure 2:
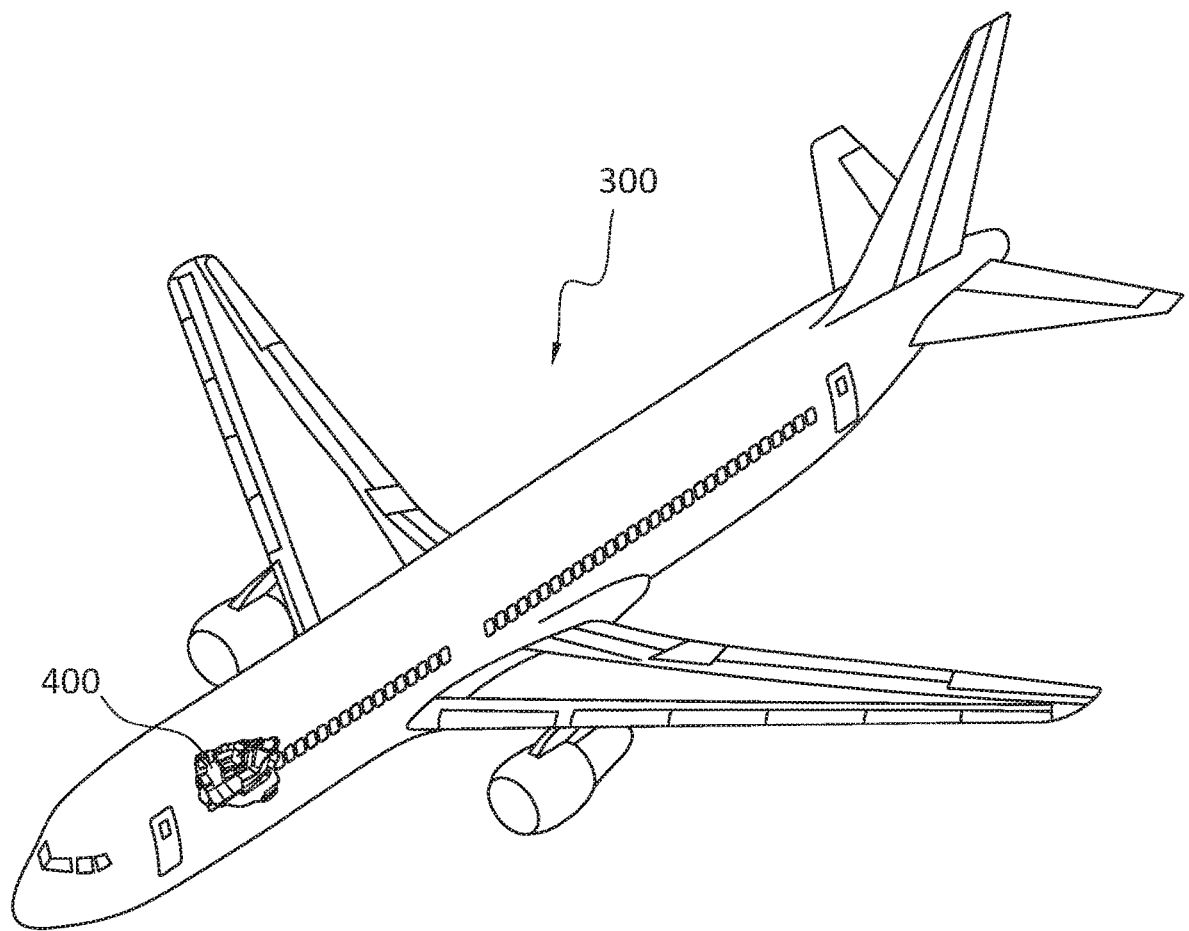
Figure 3:
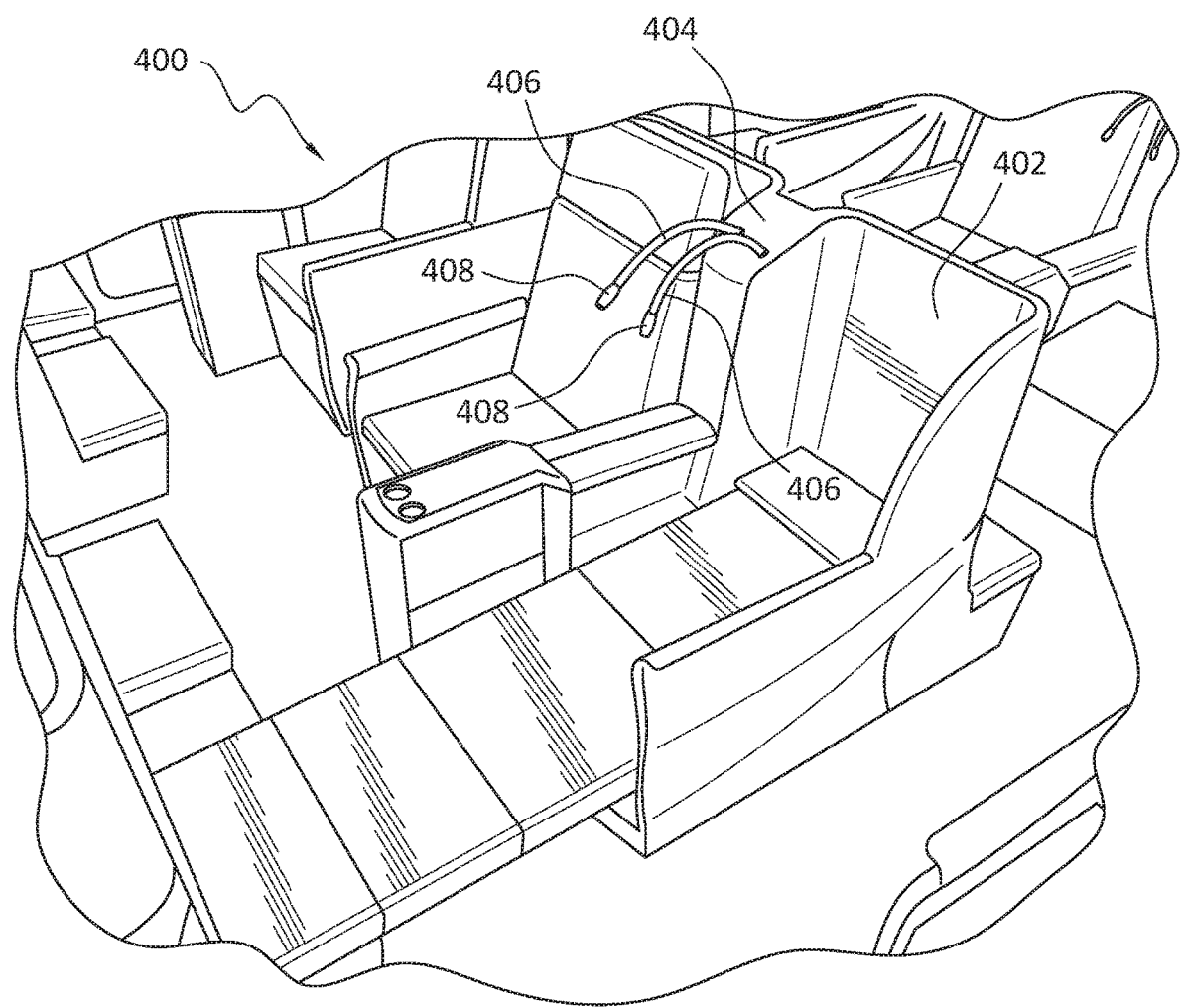
Figure 4:
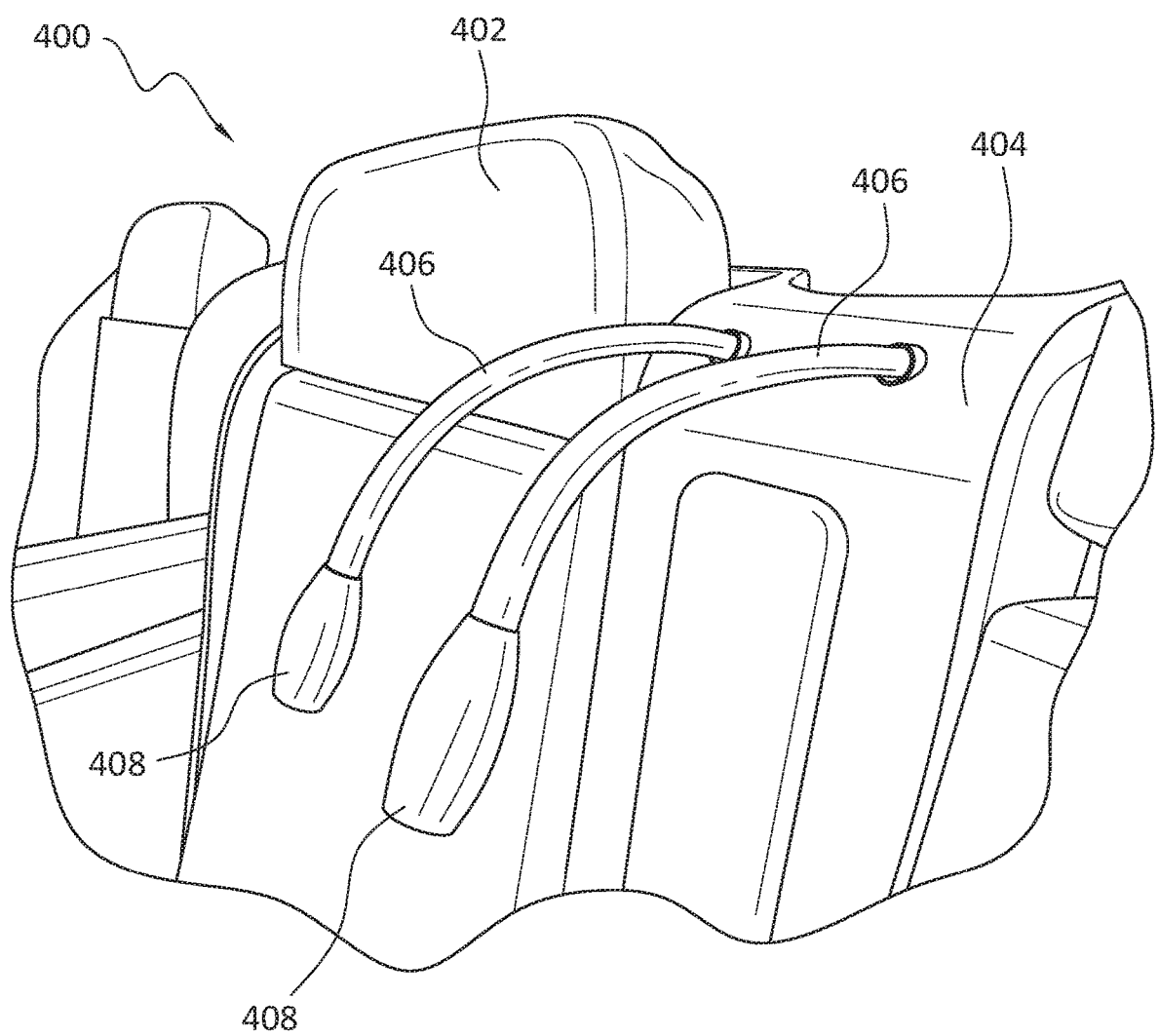
Figure 5:
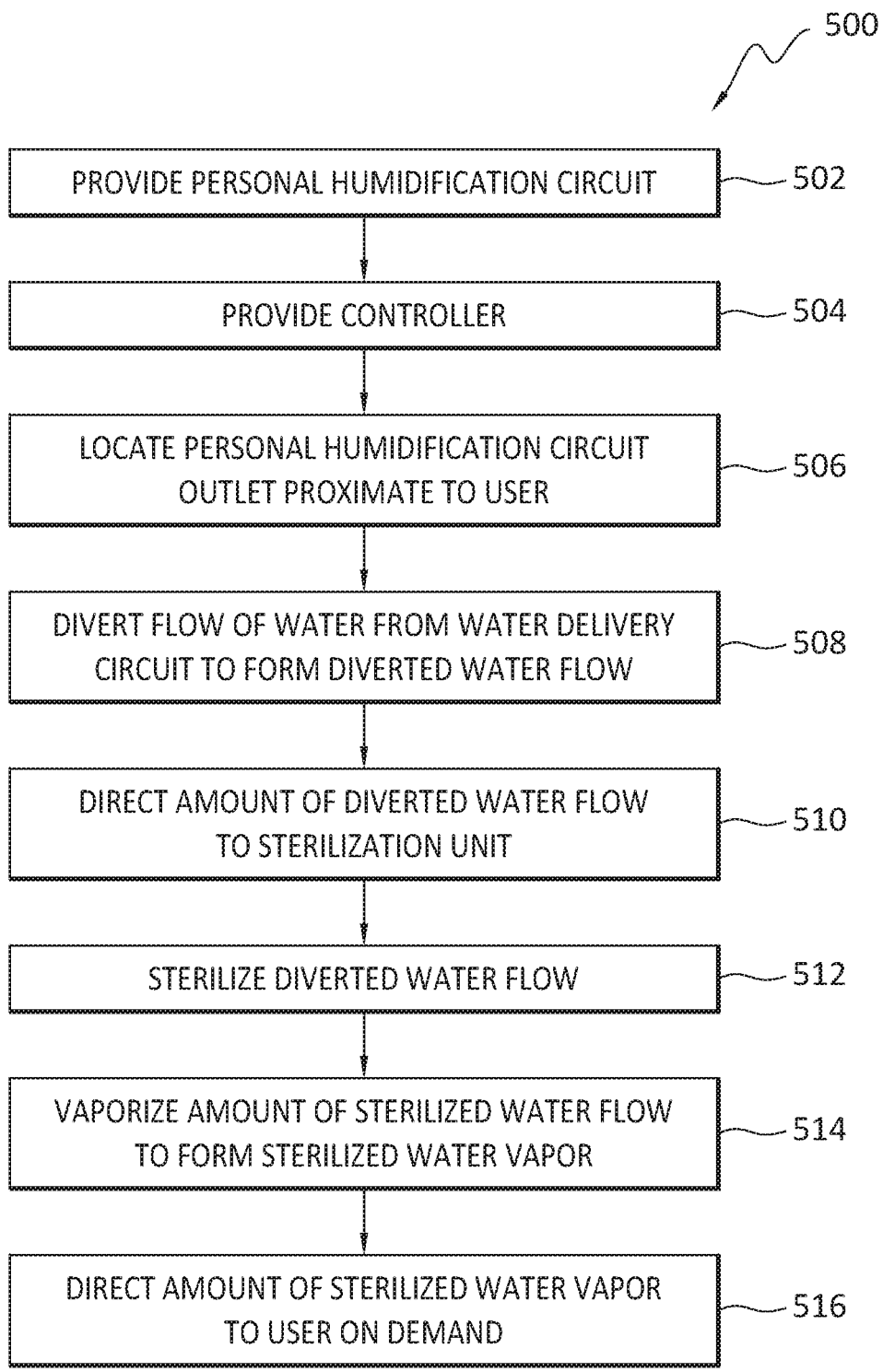
Figure 6:
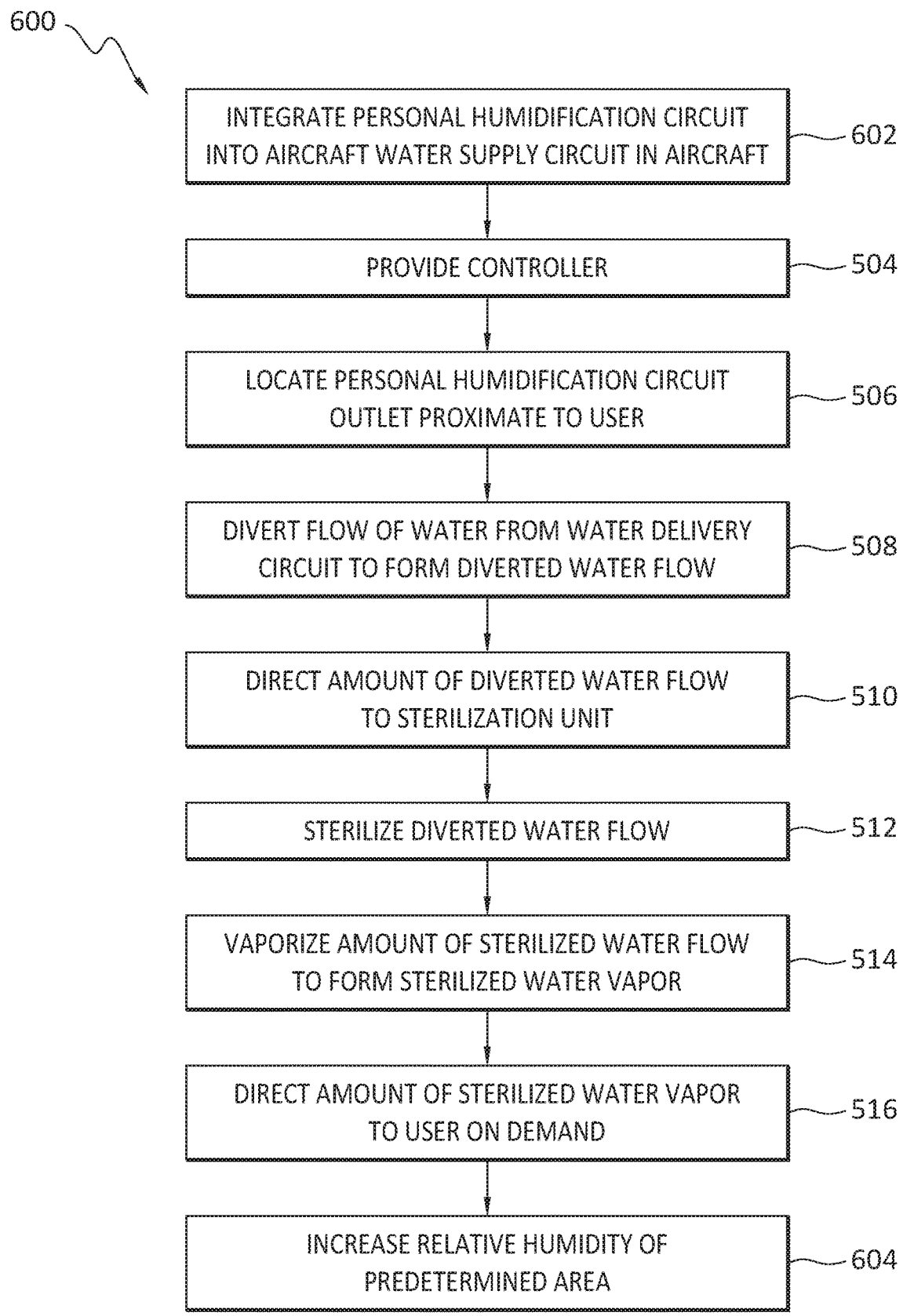

Having thus described variations of the disclosure in general terms, reference will now be made to the accompanying drawings, which are not necessarily drawn to scale, and wherein:

FIG. 1 is a non-limiting schematic illustration of a system according to a present aspect;

FIG. 2 is a non-limiting illustration of an object in the non-limiting form of a vehicle that can incorporate present aspects, with the vehicle being in the form of an aircraft, and further according to present aspects;

FIG. 3 is a non-limiting illustration of a predetermined area is the form of a vehicle passenger cabin for a vehicle of the type shown in FIG. 2, and according to present aspects;

FIG. 4 is a non-limiting illustration of a close-up view of a passenger seat in a vehicle cabin representing an area proximate to a user according to present aspects;

FIG. 5 is a flowchart outlining a method according to present aspects;

FIG. 6 is a flowchart outlining a method according to present aspects; and

Figure 7:
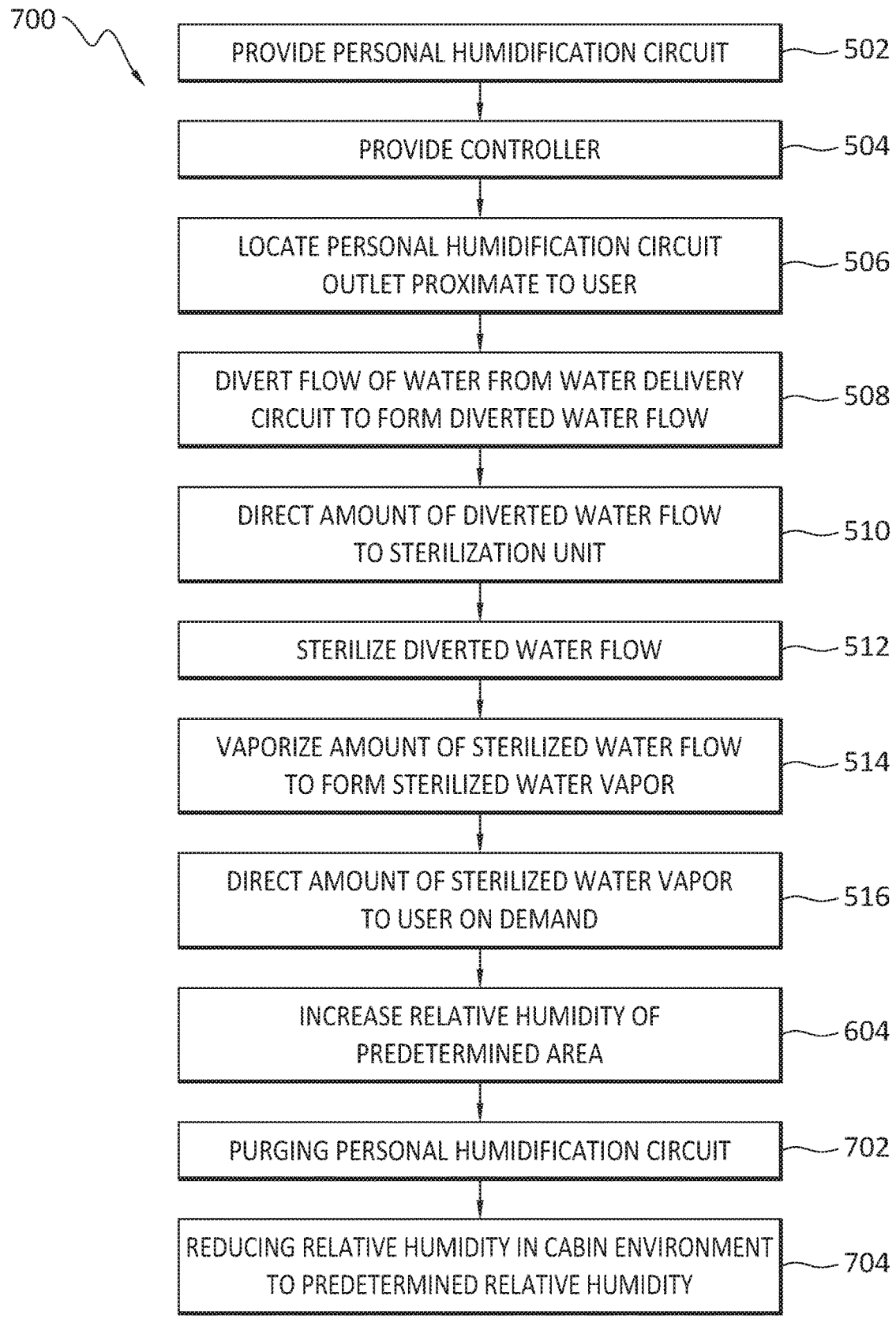

FIG. 7 is a flowchart outlining a method according to present aspects.

DETAILED DESCRIPTION

To obviate excessive moisture buildup in aircraft that could be detrimental to the longevity and operational service of component parts, the relative humidity in an aircraft during flight typically ranges from about 15 to about 20% (or from about 20% to about 25% lower than the relative humidity experienced in most homes). This lower relative humidity on aircraft results, in part, from the air conditioning of an aircraft cabin. Present aspects alleviate the effects of the lower aircraft cabin relative humidity experienced by passengers by increasing relative humidity in flight in predetermined cabin areas proximate to passengers, while also addressing the issues that otherwise would be created by a potential moisture build-up within an aircraft if relative humidity within the aircraft is increased.

FIG. 1 is a schematic diagram outlining present aspects according to one configuration. As shown in FIG. 1, system 10 for increasing the relative humidity of a predetermined area for a predetermined duration. The system 10 includes a water delivery circuit 100 and a personal humidification circuit 200. System 10 shows the water delivery circuit 100 in direct communication with the personal humidification circuit 200. A water supply 112 that can be a water tank, for example, contains a predetermined amount of water that can be an amount equal to or less than the capacity of the water supply 112. A water supply outlet 114 is in communication with a water supply line 116 that is further in communication with a pump 118 at pump inlet 118$a$. Pump outlet 118$b$, as shown, is in communication with the water supply line 116, with the water supply line continuing to feed the system 10. Water supply line 116 is further in communication with galley locations 120, 122, 124, 126 via galley inlets 120$a$, 122$a$, 124$a$, 126$a$. The water supply line 116 is further communication with lavatories 130, 132, 134 via lavatory inlets 130$a$, 132$a$, 134$a$. A personal humidification circuit inlet valve 150, that can, for example, be a three-way valve is further in communication with the water supply line 116. The operation of the personal humidification circuit inlet valve 150 can be in communication with and controlled by controller 152, with controller 152 further being in communication with a databus 154 that can be, for example, an aircraft system databus. In a further aspect, the controller 152 is integrated with other aircraft systems. This integration includes communication with other aircraft systems via an aircraft databus (e.g., a digital aircraft databus), which can provide control, indication, and status of the humidification system and status of the other aircraft systems to one another.

FIG. 1 further shows a personal humidification circuit 200 in line with, and otherwise conditionally in direct communication with the water delivery circuit 100 and water supply line 116, with personal humidification circuit 200 further including a personal humidification circuit water line 216 in communication with personal humidification circuit inlet valve 150. Personal humidification circuit inlet valve 150 is further in communication with check valve 218 via personal humidification circuit water line 216.

According to present aspects, the water delivery circuit 100 of system 10, in operation, pumps water from a water supply 112 to areas of the object (shown, for example in FIGS. 2, 3, and 4) into which system 10 has been integrated. In the case of an aircraft, the water delivery circuit 100 delivers water from a water supply 112 to destinations throughout the aircraft via the water supply line 116 including, for example, galleys and lavatories.

According to present aspects the water delivery circuit 100 and the presently disclosed personal humidification circuit interface at personal humidification circuit inlet valve 150, that can be, for example, a three way valve that can receive signals to allow or block a flow from the water delivery circuit 100 into the personal humidification circuit 200. According to a present aspect, personal humidification circuit inlet valve 150 can have an actuator for receiving signals from, for example, controller 152, or from another signal generating source not shown in FIG. 1. For example, as an aircraft ascends into flight, controller 152 can send signals to personal humidification circuit inlet valve 150 and check valve 218 for the purpose of allowing a flow of water from water delivery circuit 100 via water supply line 116 into the personal humidification circuit 200 and into the personal humidification circuit water line 216 via personal humidification circuit inlet 215.

In a further aspect, at least the controller is in communication with a databus 154, such as, in the case of an aircraft, and aircraft databus, equivalently referred to herein as a "aircraft system databus" or "vehicle system databus". The controller then accesses the databus for information regarding the aircraft, including flight information and aircraft positioning information. Based on information from the databus, the controller can have operational control to enable or disable, for example, the personal humidification circuit. When the personal humidification system is enabled, a predetermined amount of water flow from the water delivery circuit 100 is delivered into the personal humidification circuit 200.

As further shown in FIG. 1, the water that is diverted from the water delivery circuit 100 into the personal humidification circuit 200 is directed to a sterilization unit 220. The sterilization unit is configured to purify water to a predetermined degree and can include, for example, an ultraviolet (UV) radiation source, an ultrasound (UT) source, one or more filters, and combinations thereof, etc.). Water proceeds, in the form a water flow, through the personal humidification circuit water line 216, and into and out of the sterilization unit 220, with the water exiting the sterilization unit having a purity that is greater than the water entering the sterilization unit 220 to a predetermined degree to form a sterilized water flow. The sterilization unit 220 can further include a humidifier 221 that can be, for example, an atomizer, or equivalent device for the purpose of converting the sterilized water into a water vapor. In another aspect, as shown in FIG. 1, the humidifier 221 is shown downstream from the sterilization unit 220, although, the humidifier 221, if desired can be placed upstream from the sterilization unit 220, in which case, the water flow is first atomized to form water vapor, and the water vapor is then directed into and out of the sterilization unit 220 for the purpose of sterilizing the water vapor to a predetermined degree.

As shown in FIG. 1, the sterilized water flow continues through personal humidification circuit water line 216 and is diverted into personal humidification circuit water lines 216a, 216b that deliver the sanitized water flow, now in the form of water vapor, to predetermined areas in the aircraft including, as shown in FIG. 1, a passenger cabin 222. Passenger cabin 222 includes a plurality of passenger areas 224 that can coincide with, or otherwise be oriented proximate to, individual passenger seating areas. Though not shown in detail in FIG. 1, the passenger areas 224 include a personal humidification circuit outlet, from which water vapor can be directed to predetermine ed areas located proximate to, and that can "envelop" or otherwise surround a passenger that inhabits a passenger area 224.

As water vapor is directed to passenger areas, the relative humidity of such humidified passenger areas into which the water vapor is released and otherwise directed significantly increases. In this way, when a passenger, on demand, activates a control to open, or manually opens, etc. a personal humidification circuit outlet in the passenger's seat area, the water vapor flow (that can be in the form of humidified air or water-saturated air) that is released and otherwise directed into the predetermined area proximate to the passenger humidifies the air proximate to the passenger to a perceptible and quantifiable degree that is regionally greater than the relative humidity of the remainder or totality of the air in the aircraft (through the presence of the released water vapor into the passenger area). According to present aspects, the humidified air proximate to a passenger inhabiting a predetermined area impacted by the humidified air can experience a relative humidity increase in the predetermined area ranging from about 10 to about 25%.

The personal humidification circuit, if desired can be modified such that the sterilization and humidifier (e.g., atomizer) unit or units can be placed at various locations within the personal humidification circuit. For example, the various units can be placed in any "order" relative to one another, or can be located closer to the personal humidification outlets, so long as a sterilized water vapor is delivered, on demand to a predetermined area (e.g., inhabiting a user), and the relative humidity is increased to a predetermined degree in the predetermined area. That is, the humidifier can be placed downstream from the sterilization unit with the sterilized water flow exiting the sterilization unit, with the sterilized water flow then converted into a sterilized water vapor "flow" by the humidifier/atomizer. According to further aspects, the humidifier can be placed upstream from the sterilization unit with water vapor flow exiting the humidifier, and with the water vapor flow then proceeding into or through a sterilization unit where the water vapor flow is then sterilized.

While multiple individual sterilization and/or humidifiers can be integrated into present apparatuses, systems, and methods (as opposed to a centralized, single sterilization unit and a single humidifier), such integration of multiple sterilizers and/or humidifiers may frustrate weight concerns or add complexity to the desired personal humidification systems, circuits, apparatuses, methods, etc., described herein.

Further, auxiliary water supplies (e.g., water supply tanks, cylinders, etc.) that already contain sterilized water could be incorporated into the present aspects, and could therefore exist separately from the water delivery circuit 100. Such aspects contemplate obviating the need for valve hardware that diverts water flow from a general water supply system to the personal humidification circuit. However, diverting/treating/sterilizing water from a primary water supply (e.g., a unified water source) that already exists on an aircraft, and according to present aspects, is thought to greatly enhance the efficiency and simplicity of the presently disclosed apparatuses, systems, and methods, and potentially ameliorates concerns regarding additional weight.

Present aspects further address the need to return an increased relative humidity in predetermined areas to a drier state having a lower humidity, to avoid the accumulation of moisture on surfaces including on component surfaces that could be adversely impacted by such a moisture accrual or moisture "build up". Such moisture accumulation can occur or otherwise become exacerbated during the descent of an aircraft. For example, during flight in the process of attaining and maintaining cruising altitudes, for example altitudes in excess of about 20,000 ft., pressurization within the aircraft cabin exacerbates the reduction in cabin relative humidity in combination with the operation of the air conditioning units. While being bound to no individual theory, it is believed that the increases in relative humidity in areas of the cabin afforded by aspects of the present disclosure partially saturate the drier cabin air in the region of release of the air having an increased relative humidity. As the aircraft descends and the pressure differential between the inside and outside of the aircraft begins to equalize, the partially-saturated cabin air that now has a higher relative humidity could release water vapor from the cabin air resulting in unwanted condensation on cabin component and electrical component surfaces.

According to further present aspects, the presently disclosed apparatuses, systems, and methods also address this need to avoid a moisture or condensation accrual (e.g., a post-flight moisture accrual, or a moisture accrual during descent, etc.), by providing a purging of the personal humidification circuit (e.g., in response to a controller, etc.) that eliminates any relative humidity increase enjoyed by passengers during a flight, but that could prove detrimental to aircraft structures and/or aircraft components, assemblies, sub-assemblies, etc. that could be sensitive to unwanted moisture and/or moisture accrual. The purging of the personal humidification circuit, according to present aspects, reduces the relative humidity and further dries and sanitizes the water delivery circuit and the personal humidification circuit.

According to present aspects, as an aircraft conducts a descent and the opportunity for moisture accrual could occur on surfaces, As further shown in FIG. 1 the controller 152 continues to access flight information from the databus 154 and perceives conditions, via pressure monitoring, or flight time, or geographic positioning, or altitude recognition, that enable the controller 152 to signal the personal humidification circuit 200, (e.g. by sending a signal that is received by an actuator integrated or otherwise in communication with valve 150 and/or check valve 218. Upon receipt of a signal, for example, by a valve actuator (not shown) that is sent from the controller 152, the valve will impede water flow into the personal humidification circuit. This operation will disable the personal humidification circuit, or otherwise shut the personal humidification circuit/system off, and the controller can further take control of the system away from an individual passenger/user, or otherwise override the ability of an individual to activate the personal humidification circuit.

At this point, in a further sequence, that can occur substantially concurrently with the shutting off of one or both of personal humidification circuit inlet valve 150, and check valve 218, and that can occur, for example, at a predetermined altitude (e.g., a predetermined altitude during an aircraft descent, or predetermined altitude range during an aircraft descent, etc.), the controller 152 can signal purge valve 230 to open (e.g., substantially coincident with the shut off signal(s) sent by the controller to the personal humidification circuit inlet valve 150, and check valve 218, with, e.g., personal humidification circuit inlet valve 150, and check valve 218 incorporating an actuator configured to receive a signal from the controller, etc.). According to a present aspect, the controller 152 sends signals to purge valve 230 based in part on an aircraft altitude as read or otherwise detected through an aircraft system databus that is in communication with the controller 152. Purge valve 230 incorporates or is in communication with a venturi feature 234 to create a pressure differential to further facilitate fluid evacuation from personal humidification circuit 200 at a predetermined time (e.g., the conclusion of a flight, during descent, at a predetermined altitude, when a predetermined pressure delta is sensed, etc.).

Altitude detection is read according to, in part, pressure differential (e.g. the pressure delta) between the static and dynamic pitot probes situated to otherwise oriented in communication with the exterior of the aircraft. According to present aspects, the pressure delta can be determined (e.g., calculated) by a separate system in communication with the aircraft databus that, in turn, is in communication with controller 152.

The pressure difference between the aircraft interior (higher pressure of, for example, about 9 psi) and the aircraft exterior (lower pressure of, for example, about 2 psi) and across the skin of the aircraft, will facilitate the rapid elimination (e.g., removal, clearance, etc.) of the water and water vapor that existed in the personal humidification circuit from such circuit, and further facilitate a return of a lower relative humidity within the aircraft cabin areas. Present aspects further contemplate, for example, that after system evacuation occurs and, for example, as part of pre-flight check and before flight departure, purge valve 230 would be confirmed to be in a closed position. FIG. 1 further shows the incorporation of a muffler 232 configured dampen noise that may attend the evacuation of the personal humidification system and/or otherwise dampen noise caused by opening an evacuation point from the aircraft cabin, or the aircraft, etc.

Regarding passenger initiation and operation or termination of the personal humidification circuit while an aircraft is in flight, present aspects further contemplate the ability of a passenger to activate or terminate activation of the present systems and apparatuses by engaging a control unit located proximate to, for example, a seated passenger (e.g. controls in a console arm rests. in the seat, integrated into the circuit output device, etc.). Present aspects further contemplate a passenger engaging an "app" on a phone or tablet, or computer, etc., with the app able to access a wi-fi system (e.g. Bluetooth, etc.) and with elements of the personal humidification system (controller, valves, outputs, etc.) able to receive signals from the user's device to control, modify, terminate use of the circuit for changing or maintaining a particular relative humidity value at a particular location or area within the cabin and proximate to a particular passenger/user.

FIG. 2 is an illustration of an object 300 incorporating the apparatuses and systems disclosed herein, with the object shown in the form of a vehicle, and more particularly in the form of an aircraft. The aircraft shows an exposed representative partial view of a aircraft cabin interior 400, that is shown in greater detail in FIGS. 3 and 4. The cabin and aircraft can incorporate the systems and apparatuses described above and as shown in FIG. 1.

FIG. 3 shows a partial view of an aircraft cabin interior 400. Passenger seats 402 are shown with console 404 shown disposed and otherwise oriented between passenger seats 402. Shown for non-limiting illustrative purposes, personal humidification circuit outlets 406 are shown as flexible "stalks" that protrude from the console 404. Personal humidification circuit outlets terminate in outlet heads 408 (e.g., referred to equivalently herein as a "nozzle", an "emission device", etc.) from which water vapor generated in the personal humidification circuit will emanate or otherwise be directed to a predetermined direction and in a predetermined amount (e.g., volume, force, velocity, etc.) to a predetermined area proximate to a passenger/user. FIG. 4 is an enlarged view of the console 404 shown in FIG. 3, and further illustrate the enumerated features shown in FIG. 3. The cabin environment as shown in FIGS. 3 and 4 can be incorporated into, for example, the object 300 in the form of an aircraft as shown in FIG. 2, and the cabin environment and aircraft can incorporate the systems and apparatuses described above and as shown in FIG. 1.

Present aspects further contemplate a relative humidity increase may only impact an area or region proximate to a personal humidification circuit outlet, with the region being, for example, including a distance from the output of about 2 ft., and that the circuit can have, for example the capacity to most effectively increase the relative humidity of a 2 ft² area as measured from the output device.

As disclosed herein, the present apparatuses, systems, and methods, according to present aspects include primarily systems for increasing relative humidity in aircraft by a user, on demand, when an aircraft is operating at a point in a within a flight duration where relative humidity in a contained setting such as, for example an aircraft passenger cabin can otherwise experience a relative humidity that is significantly lower than an ambient relative humidity to which a passenger may be accustomed. The present apparatuses, systems, and methods contemplate delivery of a stream or flow of sterilized water vapor to a predetermined area that is proximate to a passenger (equivalently referred to herein as a "user" or "passenger/user") through the individual and on-demand action of a passenger in desiring an increase in relative humidity in an area inhabited by the passenger. According to further aspects, the initiation, continued operation, and termination of the personal humidification circuit can be controlled by a controller that is able to communicate with a data bus (equivalently referred to herein as an "aircraft databus" or "flight control databus", etc.) that collects information about the aircraft including status and operational information concerning the flight and the aircraft. The controller having access to such information is then able to send signals to the components of the personal humidification circuit including valves, pumps, etc., such that the controller can override use of the circuit by individual passengers. In other words, though a passenger may attempt to initiate the personal humidification circuit using controls located in the area inhabited by the passenger, the circuit's use may be restricted by the controller until the aircraft has reached a point above a particular altitude or has reached a time duration of the flight, etc. The controller may then terminate operation of the personal humidification circuit when the aircraft descends below a predetermined altitude, or based on having reached a particular time of the flight's duration, etc. According to present aspects, personal humidification circuit can be incorporated or otherwise retrofit into existing water delivery circuits that presently exist on aircraft.

Present aspects can further include installing relative humidity sensors in predetermined passenger areas, with the sensors configured to send signals to a controller for the purpose of controlling the personal humidification circuit able to be activated automatically at a particular area in response to achieving or maintaining a particular desired relative humidity that can be programmed by a passenger, etc.

According to further aspects, methods for increasing the relative humidity of a predetermined are further contemplated, and outlined, in non-limiting fashion in FIGS. 5, 6, and 7. FIG. 5 is a flowchart outlining a method according to present aspects. As shown in FIG. 5, a method 500 includes providing 502 a personal humidification circuit, with the personal humidification circuit including and with the personal humidification circuit including a personal humidification inlet, with the personal humidification circuit inlet in communication with a water supply line, a check valve in communication with the water supply line, a personal humidification circuit water line in communication with the check valve, a sterilization unit in communication with the personal humidification circuit water line, a humidifier in communication with the personal humidification circuit water line, with the humidifier configured to form water vapor, a water vapor line in communication with the humidifier, said water vapor line located downstream from the humidifier, and a personal humidification circuit user outlet in communication with the water vapor line. The method shown in FIG. 5 further includes providing 504 a controller, with the controller in communication with the personal humidification circuit, locating 506 the personal humidification circuit user outlet in an area proximate to a user, and diverting 508 a predetermined amount of a flow of water from a water supply circuit to the personal humidification circuit to form a diverted water flow. The method further includes directing 510 a predetermined amount of the diverted water flow to the sterilization unit, sterilizing 512 a predetermined amount of the diverted water flow to form a sterilized water flow, vaporizing 514 an amount of the sterilized water flow to form an amount of sterilized water vapor, and directing 516 an amount of the sterilized water vapor to the area proximate to a user on demand, and increasing the relative humidity of a predetermined area for a predetermined duration.

FIG. 6 is a flowchart outlining a method according to present aspects. As shown in FIG. 6, a method 600 includes providing and/or integrating 602 a personal humidification circuit into an aircraft water supply circuit (e.g., an aircraft water supply circuit designed to be integrated into an aircraft), with the personal humidification circuit including a personal humidification inlet, with the personal humidification circuit inlet in communication with a water supply line, a check valve in communication with the water supply line, a personal humidification circuit water line in communication with the check valve, a sterilization unit in communication with the personal humidification circuit water line, a humidifier in communication with the personal humidification circuit water line, with the humidifier configured to form water vapor, a water vapor line in communication with the humidifier, said water vapor line located downstream from the humidifier, and a personal humidification circuit user outlet in communication with the water vapor line. The method 600 shown in FIG. 6 further includes providing 504 a controller, with the controller in communication with the personal humidification circuit, locating 506 the personal humidification circuit user outlet in an area proximate to a user, and diverting 508 a predetermined amount of a flow of water from a water supply circuit to the personal humidification circuit to form a diverted water flow. The method further includes directing 510 a predetermined amount of the diverted water flow to the sterilization unit, sterilizing 512 a predetermined amount of the diverted water flow to form a sterilized water flow, vaporizing 514 an amount of the sterilized water flow to form an amount of sterilized water vapor, and directing 516 an amount of the sterilized water vapor to the area proximate to a user on demand, and increasing the relative humidity of a predetermined area for a predetermined duration. Method 600 further includes increasing 604 the relative humidity of a predetermined area for a predetermined duration and, if desired, to a predetermined degree FIG. 7 is a flowchart outlining a method according to present aspects. As shown in FIG. 7, a method 700 includes providing 502 a personal humidification circuit, with the personal humidification circuit including and with the personal humidification circuit including a personal humidification inlet, with the personal humidification circuit inlet in communication with a water supply line, a check valve in communication with the water supply line, a personal humidification circuit water line in communication with the check valve, a sterilization unit in communication with the personal humidification circuit water line, a humidifier in communication with the personal humidification circuit water line, with the humidifier configured to form water vapor, a water vapor line in communication with the humidifier, said water vapor line located downstream from the humidifier, and a personal humidification circuit user outlet in communication with the water vapor line. The method 700 shown in FIG. 7 further includes providing 504 a controller, with the controller in communication with the personal humidification circuit, locating 506 the personal humidification circuit user outlet in an area proximate to a user, and diverting 508 a predetermined amount of a flow of water from a water supply circuit to the personal humidification circuit to form a diverted water flow. The method further includes directing 510 a predetermined amount of the diverted water flow to the sterilization unit, sterilizing 512 a predetermined amount of the diverted water flow to form a sterilized water flow, vaporizing 514 an amount of the sterilized water flow to form an amount of sterilized water vapor, and directing 516 an amount of the sterilized water vapor to the area proximate to a user on demand, and increasing the relative humidity of a predetermined area for a predetermined duration. Method 700 further includes increasing 602 the relative humidity of a predetermined area for a predetermined duration and, if desired, to a predetermined degree. Method 700 further includes purging 702 the personal humidification circuit in response to the controller receiving information from the aircraft databus, and reducing 704 the humidity of the of air present in a cabin environment to a predetermined relative humidity.

The present aspects may, of course, be carried out in other ways than those specifically set forth herein without departing from essential characteristics of the disclosure. The present aspects are to be considered in all respects as illustrative and not restrictive, and all changes coming within the meaning and equivalency range of the appended claims are intended to be embraced therein.

What is claimed is:

1. An apparatus comprising:
    a personal humidification circuit comprising;
        a personal humidification circuit inlet valve, said personal humidification circuit inlet valve in communication with a water supply line;
        a check valve in communication with the water supply line;
        a personal humidification circuit water line in communication with the check valve;
        a sterilization unit in communication with the personal humidification circuit water line;
        a humidifier in communication with the personal humidification circuit water line, said humidifier configured to form water vapor;
        a water vapor line in communication with the humidifier, said water vapor line located downstream from the humidifier;
        a personal humidification circuit outlet in communication with the water vapor line; and
        a controller in communication with the personal humidification circuit, said controller configured to control a predetermined water vapor flow from the water vapor line to the personal humidification circuit outlet on demand, said controller further in communication with an aircraft databus.

2. The apparatus of claim 1, wherein the personal humidification circuit inlet valve is in communication with the water supply line, and wherein the personal humidification circuit inlet valve is configured to divert water flow from the water supply line to the personal humidification circuit water line.

3. The apparatus of claim 1, wherein the personal humidification circuit is integrated into an existing water delivery circuit.

4. The apparatus of claim 1, wherein the personal humidification circuit outlet is integrated into a structure, wherein said structure comprises at least one of: a cabin wall, a cabin floor, a cabin ceiling, a storage bin, and a passenger seat assembly.

5. The apparatus of claim 1, wherein the sterilization unit comprises a source of ultraviolet radiation.

6. A system comprising:
    a water delivery circuit, said water delivery circuit comprising:
        a water supply, said water supply comprising a water supply outlet
        a water supply line in communication with the water supply outlet;
    a personal humidification circuit comprising;
        a personal humidification circuit inlet valve, said personal humidification circuit inlet valve in communication with the water supply line;
        a check valve in communication with the water supply line;
        a personal humidification circuit water line in communication with the check valve;
        a sterilization unit in communication with the personal humidification circuit water line;
        a humidifier in communication with the personal humidification circuit water line, said humidifier configured to form water vapor;
        a water vapor line in communication with the humidifier, said water vapor line located downstream from the humidifier;
        a personal humidification circuit outlet in communication with the water vapor line;
        a controller in communication with the personal humidification circuit, said controller configured to control a predetermined water vapor flow from the water vapor line to the personal humidification circuit outlet, said controller further in communication with an aircraft databus; and wherein said personal humidification circuit is configured to release an amount of water vapor to increase the relative humidity of air proximate to a user, said user located in a predetermined area.

7. The system of claim 6, wherein the personal humidification circuit is configured to release a predetermined amount of water vapor from the personal humidification circuit outlet to increase the relative humidity of air proximate to the user on demand.

8. The system of claim 6, wherein the personal humidification circuit outlet is opened in response to a signal from the controller.

9. The system of claim 6, wherein said humidifier is located downstream from the sterilization unit.

10. The system of claim 6, said system further comprising:
   a purge valve in communication with the personal humidification circuit and said purge valve further in communication with the controller, said purge valve configured to respond to a signal sent from the controller.

11. The system of claim 6, wherein the personal humification circuit is integrated into the water delivery circuit.

12. An object comprising the system of claim 6.

13. The system of claim 10, wherein the controller is configured to activate the purge valve in response to a detected pressure differential.

14. The object of claim 12, wherein the object comprises a vehicle.

15. The vehicle of claim 14, wherein the vehicle is selected from at least one of:
   an aircraft; a spacecraft; a rotorcraft, a satellite; a terrestrial vehicle; a hovercraft;
   a water borne surface vehicle; a water borne sub-surface vehicle; and
   combinations thereof.

16. A method comprising:
   providing a personal humidification circuit, said personal humidification circuit comprising;
      a personal humidification circuit inlet valve, said personal humidification circuit inlet valve in communication with a water supply line;
      a check valve in communication with the water supply line;
      a personal humidification circuit water line in communication with the check valve;
         a sterilization unit in communication with the personal humidification circuit water line;
         a humidifier in communication with the personal humidification circuit water line, said humidifier configured to form water vapor;
            a water vapor line in communication with the humidifier, said water vapor line located downstream from the humidifier;
         a personal humidification circuit outlet in communication with the water vapor line;
   providing a controller, said controller in communication with the personal humidification circuit;
   locating the personal humidification circuit outlet in an area proximate to a user; and
   diverting a predetermined amount of a flow of water from a water supply circuit to the personal humidification circuit to form a diverted water flow;
   directing a predetermined amount of the diverted water flow to the sterilization unit;
   sterilizing a predetermined amount of the diverted water flow to form a sterilized water flow;
   vaporizing a predetermined amount of the sterilized water flow to form an amount of sterilized water vapor;
   directing a predetermined amount of the sterilized water vapor to the area proximate to a user on demand; and
   increasing the relative humidity of a predetermined area for a predetermined duration.

17. The method of claim 16, further comprising:
   integrating the personal humidification circuit into an aircraft.

18. The method of claim 16, further comprising:
   integrating the personal humidification circuit into an aircraft water supply circuit.

19. The method of claim 16, wherein the controller is in communication with an aircraft databus.

20. The method of claim 19, further comprising:
   purging the personal humidification circuit in response to the controller receiving information from the aircraft databus; and
   reducing the relative humidity of air present in a cabin environment to a predetermined relative humidity.

* * * * *